(12) United States Patent
Raed et al.

(10) Patent No.: US 8,779,893 B2
(45) Date of Patent: Jul. 15, 2014

(54) SYSTEM AND METHOD FOR CONTROLLING VEHICLE IGNITION

(75) Inventors: Muhammad Wasim Raed, Dhahran (SA); Abdelhafid Bouhraoua, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 359 days.

(21) Appl. No.: 13/230,500

(22) Filed: Sep. 12, 2011

(65) Prior Publication Data

US 2013/0063244 A1    Mar. 14, 2013

(51) Int. Cl.
*G05B 19/00* (2006.01)
*H04Q 5/22* (2006.01)
*B60R 25/04* (2013.01)

(52) U.S. Cl.
USPC ........... 340/5.8; 340/5.2; 340/5.26; 340/5.61; 340/5.63; 340/10.41; 307/10.5

(58) Field of Classification Search
USPC .......................................................... 340/5.8
See application file for complete search history.

(56) References Cited

U.S. PATENT DOCUMENTS

| | | | |
|---|---|---|---|
| 4,805,722 A | 2/1989 | Keating et al. | |
| 4,843,463 A | 6/1989 | Michetti | |
| 5,803,043 A | 9/1998 | Bayron et al. | |
| 6,469,616 B1 * | 10/2002 | Lindner et al. | 340/5.26 |
| 6,532,298 B1 * | 3/2003 | Cambier et al. | 382/117 |
| 6,898,489 B1 | 5/2005 | Hayes, Sr. | |
| 7,741,952 B2 | 6/2010 | Denison et al. | |
| 2002/0135679 A1 | 9/2002 | Scaman | |
| 2004/0263316 A1 | 12/2004 | Dix et al. | |
| 2009/0021344 A1 | 1/2009 | Proefke et al. | |
| 2010/0005314 A1 | 1/2010 | Johnson et al. | |
| 2010/0141431 A1 | 6/2010 | Boss et al. | |
| 2010/0212986 A1 | 8/2010 | Roth | |
| 2011/0276609 A1 * | 11/2011 | Denison | 707/812 |

FOREIGN PATENT DOCUMENTS

| | | |
|---|---|---|
| DE | 102008033013 | 2/2009 |
| WO | WO 9631846 A1 | 10/1996 |

* cited by examiner

*Primary Examiner* — Jennifer Mehmood
*Assistant Examiner* — John Mortell
(74) *Attorney, Agent, or Firm* — Richard C. Litman

(57) ABSTRACT

The system for controlling vehicle ignition provides three separate levels of access to prevent unauthorized users from actuating ignition of a vehicle. The system includes a radio frequency identification tag having permanent computer readable memory and volatile computer readable memory associated therewith. The radio frequency identification tag is preferably embedded within a vehicle key. A predetermined permanently assigned authentication code is stored in the permanent computer readable memory and a variable time stamp is stored in the volatile computer readable memory. The permanently assigned authentication code and the variable time stamp are transmitted upon activation of the radio frequency identification tag. Vehicle ignition occurs only upon the mechanical operation of the key in a conventional ignition switch and matching of both the permanently assigned authentication code and the variable time stamp with codes and stamps stored in vehicle memory. The time stamp represents time and date of prior ignition actuation.

8 Claims, 2 Drawing Sheets

SYSTEM AND METHOD FOR CONTROLLING VEHICLE IGNITION

BACKGROUND OF THE INVENTION

1. Field of the Invention

The present invention relates generally to vehicle control systems, and particularly to a system and method for controlling vehicle ignition that uses radio frequency identification tags embedded within vehicle keys to control ignition actuation.

2. Description of the Related Art

Vehicle interlock and ignition control systems utilizing radio frequency identification (RFID) tags embedded in vehicle keys are known. An example of such a system is shown in U.S. Pat. No. 6,898,489 B1, issued to Hayes, Sr., which is herein incorporated by reference in its entirety. Security and access systems, such as that shown in the '489 patent, use an alphanumeric code or the like stored in both the RFID tag and in on-board vehicle memory. Ignition of the vehicle is actuated only upon matching of the transmitted code.

Such RFID-enabled keys, however, can be "hacked" or "cloned", allowing unauthorized users to construct their own keys or other RFID-containing articles with unauthorized copies of the access codes being stored in the RFID tag. As the unauthorized cloning of keys and other RFID-enabled articles and devices becomes more prevalent, additional layers of security become more and more necessary.

Thus, a system and method for controlling vehicle ignition solving the aforementioned problems is desired.

SUMMARY OF THE INVENTION

The system for controlling vehicle ignition provides three separate levels of access to prevent unauthorized users from actuating ignition of a vehicle. The system includes a radio frequency identification tag having permanent computer readable memory and volatile computer readable memory associated therewith. The radio frequency identification tag is preferably embedded within a vehicle key. A predetermined permanently assigned authentication code is stored in the permanent computer readable memory and a variable time stamp is stored in the volatile computer readable memory. The permanently assigned authentication code and the variable time stamp are transmitted upon activation of the radio frequency identification tag.

The system further includes a radio frequency transmitter for activating the radio frequency identification tag and directing the transmission of the permanently assigned authentication code and the variable time stamp, along with a vehicle-mounted radio frequency reader for receiving the permanently assigned authentication code and the variable time stamp transmitted from the radio frequency identification tag. A clock or timer and vehicle-mounted computer readable memory are in communication with the radio frequency transmitter and the radio frequency reader, and are integrated in a vehicle controller.

The vehicle-mounted computer readable memory stores the permanently assigned authentication code and an access time stamp generated by the clock or timer. The permanently assigned authentication code transmitted by the radio frequency transmitter is compared with the permanently assigned authentication code stored in the vehicle-mounted computer readable memory, and the vehicle controller generates a first authentication signal if the permanently assigned authentication codes match.

Similarly, the variable time stamp transmitted by the radio frequency transmitter is compared with the access time stamp stored in the vehicle-mounted computer readable memory and a second authentication signal is generated if the variable time stamp and the access time stamp match. The access time stamp and the variable time stamp represent a previous actuation of ignition of the vehicle.

Ignition of the vehicle is actuated if the key mechanically actuates the conventional ignition switch and if both the first and second authentication signals are generated. If both the first and second authentication signals are not generated, then ignition is prevented. Upon actuation of ignition, the variable time stamp and the access time stamp are updated to reflect the time and date of the present ignition actuation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
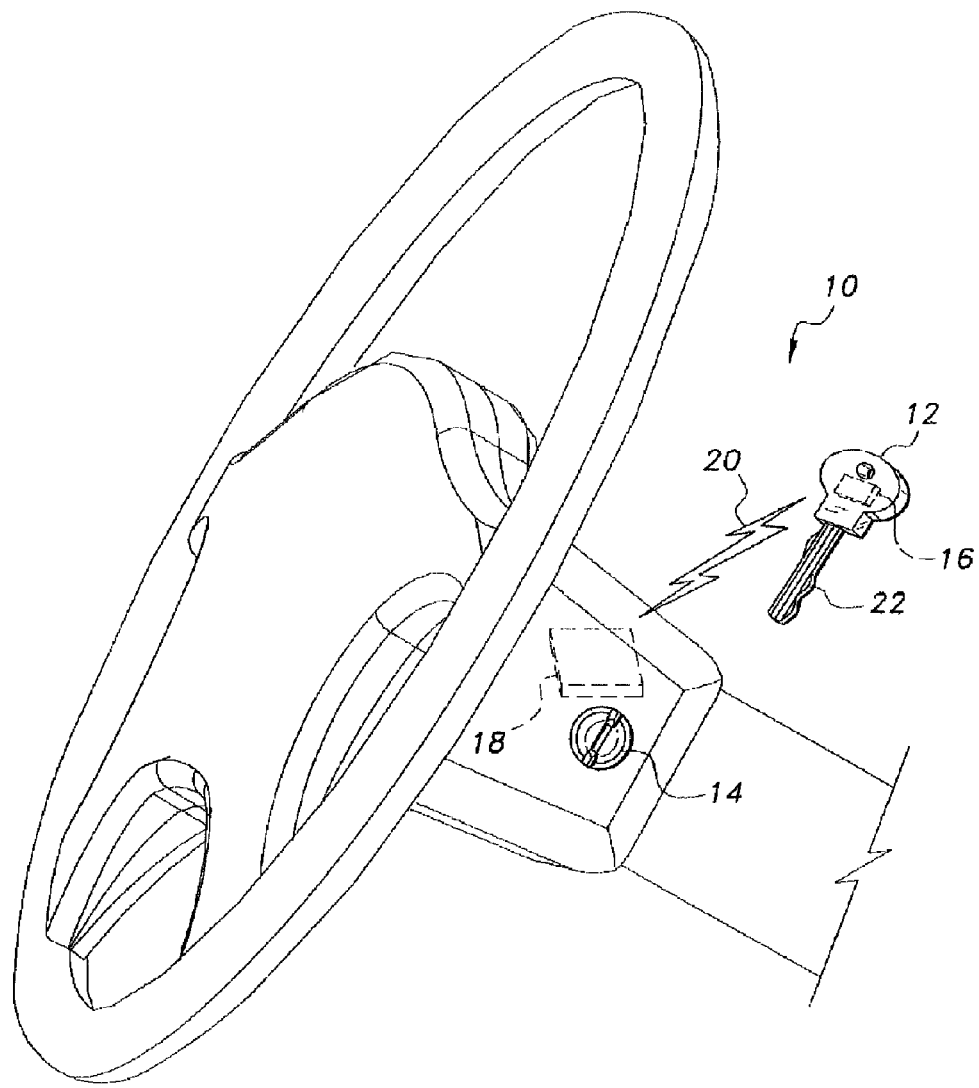
FIG. 1 is an environmental, perspective view of a system for controlling vehicle ignition according to the present invention.
Figure 2:
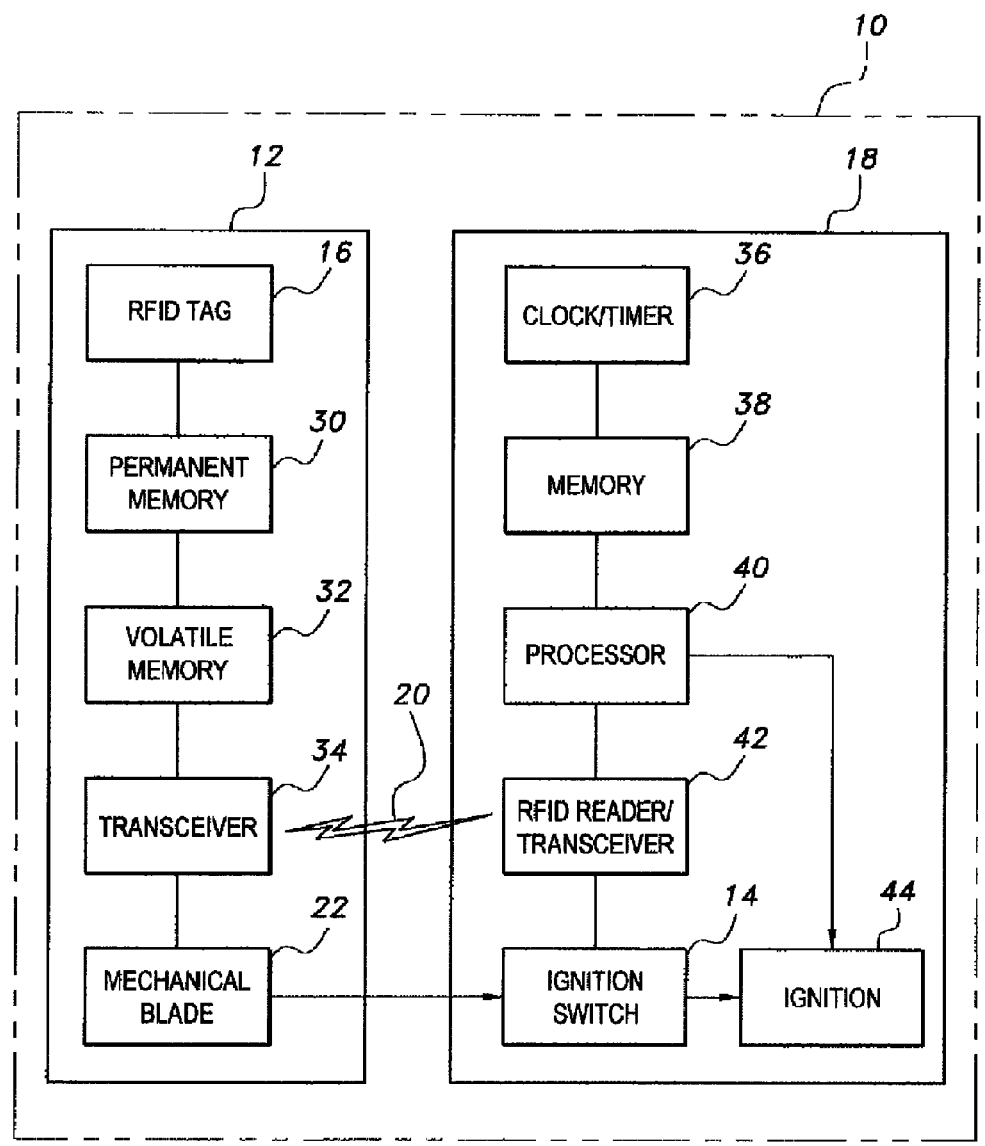
FIG. 2 is a block diagram of components in an exemplary system for controlling vehicle ignition according to the present invention.

The system for controlling vehicle ignition 10 provides three separate levels of access to prevent unauthorized users from actuating ignition of a vehicle. As shown in FIGS. 1 and 2, the system 10 includes a radio frequency identification tag 16 having both permanent computer readable memory 30 and volatile computer readable memory 32 associated therewith. The permanent computer readable memory 30 may be any suitable type of permanent memory, such as read only memory (ROM) or the like. Similarly, the volatile computer readable memory 32 may be any suitable type of volatile memory, such as random access memory (RAM), programmable read only memory (PROM), erasable programmable read only memory (EPROM), flash memory, or the like.

The radio frequency identification tag 16, the permanent memory 30, the volatile memory 32 and a radio frequency transceiver 34 are preferably embedded within vehicle key 12. Preferably, the vehicle key 12 is configured as a conventional vehicle key, as shown in FIG. 1, including a conventional key blade 22 for operating a conventional vehicle ignition switch 14. This mechanical operation is the first of the three levels of access for actuating ignition of the vehicle.

A predetermined, permanently assigned authentication code is stored in the permanent computer readable memory 30, and a variable time stamp, as will be described in greater detail below, is stored in the volatile computer readable memory 32. The permanently assigned authentication code and the variable time stamp are transmitted by transceiver 34 upon activation of the radio frequency identification tag 16 (the transmission signal is represented generally as 20 in FIG. 1). The permanently assigned authentication code may be a conventional authentication code based upon the Electronic Product Code (EPC) standard for RFID authentication.

The system further includes a radio frequency transmitter or vehicle-mounted transceiver 42 for activating the radio frequency identification tag 16 and directing the transmission of the permanently assigned authentication code and the variable time stamp (via transceiver 34). Preferably, the vehicle-mounted transceiver 42 is coupled with a vehicle-mounted radio frequency reader for receiving the permanently assigned authentication code and the variable time stamp transmitted from the radio frequency identification tag 16. A clock or timer 36 and vehicle-mounted computer readable memory 38 are in communication with the radio frequency transceiver and the radio frequency reader 42, and are integrated in a vehicle controller 18. Vehicle controller 18 further includes a processor 40, which may be any suitable type of stand-alone computer processor, a processor integrated into a conventional vehicle computer, a programmable logic controller or the like. The clock or timer 36 may be any suitable type of clock or timer circuit, or may be a clock or timer associated with the on-board vehicle computer. The vehicle-mounted computer readable memory 38 may be RAM, ROM, PROM, EPROM or any other suitable type of computer readable memory typically associated with on-board vehicle computers.

The vehicle-mounted computer readable memory 38 stores the permanently assigned authentication code and an access time stamp generated by the clock or timer 36. The permanently assigned authentication code transmitted by the radio frequency transceiver 34 is compared with the permanently assigned authentication code stored in the vehicle-mounted computer readable memory 38, and the processor 40 generates a first authentication signal if the permanently assigned authentication codes match. This is the second level of access security in system 10.

Similarly, the variable time stamp transmitted by the radio frequency transceiver 34 is compared with the access time stamp stored in the vehicle-mounted computer readable memory 38 and a second authentication signal is generated if the variable time stamp and the access time stamp match. The access time stamp and the variable time stamp represent a previous actuation of ignition of the vehicle, generated by clock or timer 36 and stored respectively in volatile memory 32 and memory 38. This represents the third layer of access security in system 10.

Ignition of the vehicle (represented generally as 44 in FIG. 2) is actuated only if the key 12 mechanically actuates the conventional ignition switch 14, and if both the first and second authentication signals are generated. If both the first and second authentication signals are not generated, then ignition is prevented. Upon actuation of ignition, the variable time stamp and the access time stamp are updated to reflect the time of the present ignition actuation. Preferably, the recorded time stamps include both time and date of ignition actuation.

It is to be understood that the present invention is not limited to the embodiments described above, but encompasses any and all embodiments within the scope of the following claims.

We claim:

1. A system for controlling vehicle ignition, comprising:
   a radio frequency identification tag having permanent computer readable memory and volatile computer readable memory associated therewith, the permanent computer readable memory having a predetermined permanently assigned authentication code being stored therein, the volatile computer readable memory having a variable time stamp being stored therein, the tag being configured for transmitting the permanently assigned authentication code and the variable time stamp upon activation of the radio frequency identification tag;
   a radio frequency transmitter configured for activating the radio frequency identification tag and directing the transmission of the permanently assigned authentication code and the variable time stamp;
   a radio frequency reader for receiving the permanently assigned authentication code and the variable time stamp transmitted from the radio frequency identification tag, the radio frequency reader being mounted in a vehicle;
   a clock mounted in the vehicle;
   vehicle-mounted computer readable memory for storing the permanently assigned authentication code and an access time stamp generated by the clock;
   means for comparing the permanently assigned authentication code transmitted by the radio frequency transmitter with the permanently assigned authentication code stored in the vehicle-mounted computer readable memory and generating a first authentication signal when the permanently assigned authentication codes match;
   means for comparing the variable time stamp transmitted by the radio frequency transmitter with the access time stamp stored in the vehicle-mounted computer readable memory and generating a second authentication signal when the variable time stamp and the access time stamp match, the access time stamp representing a previous actuation of ignition of the vehicle;
   means for actuating ignition of the vehicle when the first and second authentication signals are generated and preventing vehicle ignition unless the first and second authentication signals are generated; and
   means for updating the variable time stamp and the access time stamp upon ignition of the vehicle.

2. The system for controlling vehicle ignition as recited in claim 1, wherein said radio frequency identification tag is embedded within a vehicle key.

3. The system for controlling vehicle ignition as recited in claim 2, wherein said variable time stamp and said access time stamp include time data representative of both time and date of ignition actuation.

4. A system for controlling vehicle ignition, comprising:
   a vehicle key having a radio frequency identification tag incorporated therein, the tag having both permanent computer readable memory and volatile computer readable memory, the permanent computer readable memory having a predetermined permanently assigned authentication code is stored therein, the volatile computer readable memory having a variable time stamp is stored therein, the tag being configured for transmitting the permanently assigned authentication code and the variable time stamp upon activation of the radio frequency identification tag, the vehicle key further including a radio frequency transmitter for activating the radio frequency identification tag and directing the transmission of the permanently assigned authentication code and the variable time stamp;
   a radio frequency reader configured for receiving the permanently assigned authentication code and the variable time stamp transmitted from the radio frequency identification tag, the radio frequency reader being mounted in a vehicle;
   a clock mounted in the vehicle;
   vehicle-mounted computer readable memory for storing the permanently assigned authentication code and an access time stamp generated by the clock;

means for comparing the permanently assigned authentication code transmitted by the radio frequency transmitter with the permanently assigned authentication code stored in the vehicle-mounted computer readable memory and generating a first authentication signal when the permanently assigned authentication codes match;

means for comparing the variable time stamp transmitted by the radio frequency transmitter with the access time stamp stored in the vehicle-mounted computer readable memory and generating a second authentication signal when the variable time stamp and the access time stamp match, the access time stamp representing a previous actuation of ignition of the vehicle;

means for actuating ignition of the vehicle when the first and second authentication signals are generated and preventing vehicle ignition unless the first and second authentication signals are generated; and means for updating the variable time stamp and the access time stamp upon ignition of the vehicle.

5. The system for controlling vehicle ignition as recited in claim 4, wherein said variable time stamp and said access time stamp include time data representative of both time and date of ignition actuation.

6. A method of controlling vehicle ignition, comprising the steps of:

providing a vehicle key having a radio frequency identification tag incorporated therein, the tag having permanent computer readable memory and volatile computer readable memory associated therewith;

storing a permanently assigned authentication code in the permanent computer readable memory;

storing a variable time stamp in the volatile computer readable memory;

transmitting a radio frequency activation signal to the radio frequency identification tag to initiate operation of the radio frequency identification tag;

transmitting the permanently assigned authentication code and the variable time stamp to a vehicle-mounted radio frequency reader in response to the activation signal;

comparing the transmitted permanently assigned authentication code with a permanently assigned authentication code stored in vehicle computer readable memory and generating a first actuation signal when the permanently assigned authentication codes match;

comparing the transmitted variable time stamp with an access time stamp and generating a second actuation signal when the time stamps match, the access time stamp representing a previous actuation of ignition of the vehicle;

actuating ignition of the vehicle when the first and second actuation signals are generated and preventing ignition of the vehicle when the first and second actuation signals are not both generated; and updating the variable time stamp and the access time stamp.

7. The method of controlling vehicle ignition as recited in claim 6, further comprising the step of generating a time signal representative of time of ignition of the vehicle, the updating of the variable time stamp and the access time stamp being based upon the generated time signal.

8. The method of controlling vehicle ignition as recited in claim 7, further comprising the step of generating a date signal representative of date of ignition of the vehicle, the updating of the variable time stamp and the access time stamp being based upon the generated time signal and the generated date signal.

* * * * *